US010917961B2

(12) United States Patent
Namburu et al.

(10) Patent No.: US 10,917,961 B2
(45) Date of Patent: Feb. 9, 2021

(54) HIGH TEMPERATURE ISOLATING INSERT FOR PLASMA CUTTING TORCH

(71) Applicant: Lincoln Global, Inc., Santa Fe Springs, CA (US)

(72) Inventors: Praveen K. Namburu, Mount Pleasant, SC (US); Wayne S. Severance, Darlington, SC (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 261 days.

(21) Appl. No.: 15/963,188

(22) Filed: Apr. 26, 2018

(65) Prior Publication Data

US 2019/0082526 A1 Mar. 14, 2019

Related U.S. Application Data

(60) Provisional application No. 62/558,006, filed on Sep. 13, 2017.

(51) Int. Cl.

*B23K 10/02* (2006.01)
*H05H 1/26* (2006.01)
*H05H 1/34* (2006.01)
*H05H 1/28* (2006.01)

(52) U.S. Cl.

CPC ................ *H05H 1/26* (2013.01); *H05H 1/28* (2013.01); *H05H 1/34* (2013.01); *H05H 2001/3478* (2013.01)

(58) Field of Classification Search

CPC .......... B23K 10/00; B23K 10/02; H05H 1/26; H05H 1/28; H05H 1/34; H05H 1/3405; H05H 2001/3478; H05H 2001/3421; H05H 2001/3436; H05H 2001/3442

See application file for complete search history.

(56) References Cited

U.S. PATENT DOCUMENTS

| | | | | |
|---|---|---|---|---|
| 4,024,373 A * | 5/1977 | Bykhovsky | B23K 10/00 219/121.36 |
| 6,326,581 B1 | 12/2001 | Laimer et al. | |
| 6,498,316 B1 * | 12/2002 | Aher | B23K 10/00 219/121.39 |
| 7,145,098 B2 * | 12/2006 | MacKenzie | B23K 9/291 219/121.48 |
| 8,853,589 B2 * | 10/2014 | Krink | H05H 1/34 219/121.5 |
| 9,151,487 B2 * | 10/2015 | Stoeger | F23D 11/448 |

(Continued)

FOREIGN PATENT DOCUMENTS

GB 1 453 100 A 10/1976

OTHER PUBLICATIONS

Extended European Search Report from Corresponding Application No. 18193137.9; dated Jan. 28, 2019; pp. 1-7.

*Primary Examiner* — Brian W Jennison

(74) *Attorney, Agent, or Firm* — David J. Muzilla

(57) ABSTRACT

Embodiments of arc plasma cutting torches are disclosed. In one embodiment, a plasma cutting torch includes an insert component located substantially between a cathode body and an insulator body. The insert component is able to withstand high temperatures and can be made of a metal material or a non-metal material. The insert component can be permanent within the torch or can be replaceable, in accordance with various embodiments.

20 Claims, 6 Drawing Sheets

(56) References Cited

U.S. PATENT DOCUMENTS

| | | | | |
|---|---|---|---|---|
| 9,480,139 | B2 | 10/2016 | Zhang et al. | |
| 2009/0039062 | A1* | 2/2009 | Cretegny | H05H 1/341<br>219/129 |
| 2009/0230097 | A1* | 9/2009 | Liebold | H05H 1/28<br>219/121.49 |
| 2012/0031881 | A1* | 2/2012 | Griffin | H05H 1/28<br>219/121.5 |
| 2012/0234803 | A1 | 9/2012 | Liu et al. | |
| 2013/0087535 | A1* | 4/2013 | Barnett | B23K 10/006<br>219/121.48 |
| 2015/0334817 | A1 | 11/2015 | Namburu | |
| 2017/0042014 | A1* | 2/2017 | Sanders | H05H 1/36 |
| 2017/0064804 | A1 | 3/2017 | Namburu | |

* cited by examiner

HIGH TEMPERATURE ISOLATING INSERT FOR PLASMA CUTTING TORCH

CROSS REFERENCE TO RELATED APPLICATION

This U.S. Patent Application claims priority to and the benefit of U.S. Provisional Patent Application Ser. No. 62/558,006, filed on Sep. 13, 2017, the disclosure of which is incorporated herein by reference in its entirety.

FIELD

Embodiments of the present invention relate to systems and apparatus related to plasma cutting, and more specifically to arc plasma cutting using a torch assembly.

BACKGROUND

Plasma cutting involves the use of a high current plasma jet which generates a large amount of heat during a cutting process when cutting through workpieces of, for example, a steel plate or a steel I-beam. The plasma cutting torch is cooled during the cutting process to prevent components of the plasma cutting torch from melting down. However, heat removal from gas/air cooled plasma cutting torches is limited. Problems with a cutting torch can arise due to insufficient torch cooling, or when a torch is operated at higher duty cycles, or in the event of a catastrophic electrode failure. For example, localized heat damage of the components/isolators can restrict the free movement of the cathode or electrode of the torch, making the torch unusable.

SUMMARY

Embodiments of the present invention include plasma cutting torches having a high temperature insert. In one embodiment, the insert is made of a metal that is configured to replace an end of a plastic insulator body within the torch. Such an insert provides heat isolation which permits the use of less expensive plastics elsewhere within the torch. The insert may be permanent or replaceable, in accordance with various embodiments.

In one embodiment, a torch head of a plasma cutting torch includes an electrode, a cathode body electrically coupled to the electrode, and insert component, an insulator body, and an anode body. The insulator body is positioned substantially between the insert component and the anode body. The insert component is positioned substantially between the cathode body and the insulator body and is configured to thermally protect the insulator body from heat generated in the cathode body during a plasma cutting operation using the plasma cutting torch. The insert component may be a permanent component or a replaceable component within the torch head. The insulator body is configured to electrically insulate the cathode body from the anode body. The insert component may be made of a metal material. For example, the insert component may be made of at least one of steel, stainless steel, aluminum, aluminum alloys, copper, or copper alloys. The insert component may be made of a non-metal material. For example, the insert component may be made of at least one of a polymer material or a composite material. The insert component may be made of a polyimide-based plastic material, in accordance with one embodiment. The insert component is made of an engineered material, in one embodiment. The insert component may be at least partially within the insulator body.

In one embodiment, a torch head of a plasma cutting torch includes a substantially cylindrical electrode, a cathode body circumferentially surrounding at least a portion of the electrode, an insert component circumferentially surrounding at least a portion of the cathode body, an insulator body circumferentially surrounding at least a portion of the insert component, and an anode body circumferentially surrounding at least a portion of the insulator body. The insert component is made of a material that is configured to at least partially thermally isolate the insulator body from the cathode body during a plasma cutting operation using the plasma cutting torch. The insert component may be a permanent component or a replaceable component within the torch head. The insulator body is configured to electrically insulate the cathode body from the anode body. The insert component may be made of at least one of steel, stainless steel, aluminum, aluminum alloys, copper, or copper alloys. The insert component may be made of at least one of a polymer material or a composite material. The insert component may be made of a polyimide-based plastic material, in accordance with one embodiment. The insert component is made of an engineered material, in one embodiment. The insert component may be at least partially within the insulator body.

Numerous aspects of the general inventive concepts will become readily apparent from the following detailed description of exemplary embodiments, from the claims and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

In general, plasma arc cutting torches may include an electrode and a nozzle in which a nose end of the electrode is supported such that the end of the nose of the electrode faces an end wall of the nozzle which has a plasma outlet opening there-through. The electrode and nozzle may be relatively displaceable between a position in which the electrode contacts the end wall of the nozzle and a position in which the electrode is spaced an operating distance from the end wall, whereby a pilot arc can be created as the electrode moves away from the end wall to its operating position. Alternatively, the electrode and nozzle can be fixed relative to one another, whereby the torch is started by the use of high frequency or other known starting procedures.

In any event, the end wall of the nozzle and the end face of the electrode provide a gas chamber into which a plasma or arc gas (cutting gas) is supplied and from which a plasma jet is emitted through the outlet opening. A pilot arc current flows between the electrode and the nozzle or a main, and a transferred arc flows between the electrode and the workpiece. A swirling motion may be imparted to the plasma gas upstream of the gas chamber for cooling purposes and in an effort to keep the emitted plasma jet focused on line with the axis of the electrode. A shielding gas and cooling fluid may also be supplied to the plasma arc cutting torch. Various hoses (tubes) and cables (e.g., in the form of a harness of leads) may be provided for providing the cutting gas, the shielding gas, the cooling fluid, and electric current to the plasma arc cutting torch. Various embodiments of a plasma arc cutting torch may include, for example, a torch body, a water cooling tube, an electrode, a plasma gas distributor, a nozzle, a retaining cap, a shield cap, and a shield cup. Other elements are possible as well, in accordance with other embodiments.

Figure 1:
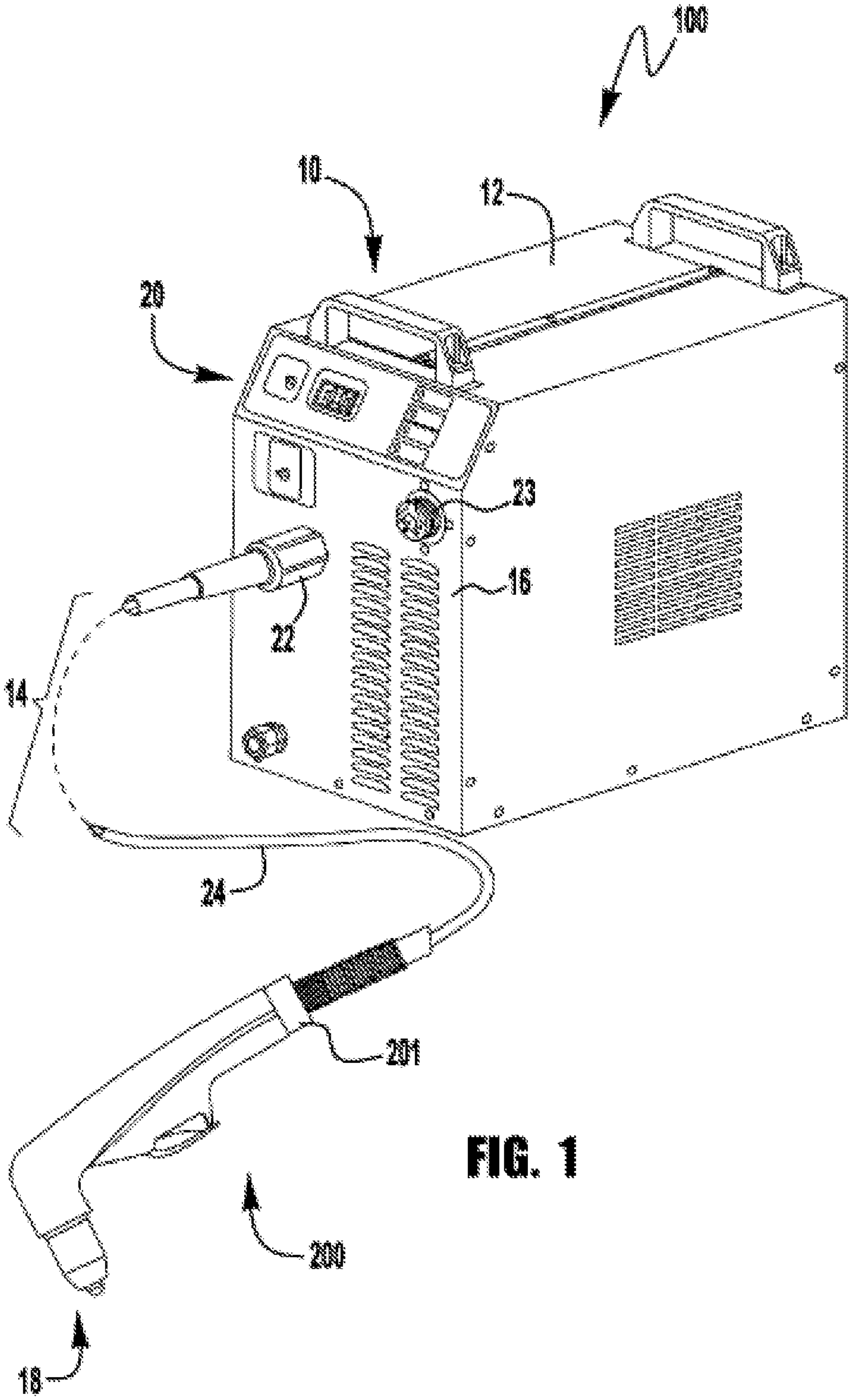
FIG. 1 illustrates an exemplary cutting system which can be used with embodiments of plasma cutting torches.

Referring now to the drawings, which are for the purpose of illustrating exemplary embodiments of the present invention only and not for the purpose of limiting same, FIG. 1 illustrates an exemplary cutting system 100 which can be used with embodiments of plasma cutting torches. The system 100 includes a power supply 10 which includes a housing 12 with a connected torch assembly 14. The housing 12 includes the various conventional components for controlling a plasma arc torch, such as a power supply, a plasma starting circuit, air regulators, fuses, transistors, input and output electrical and gas connectors, controllers and circuit boards, etc. The Torch assembly 14 is attached to a front side 16 of the housing. The torch assembly 14 includes within it electrical connectors to connect an electrode and a nozzle within the torch end 18 to electrical connectors within the housing 12. Separate electrical pathways may be provided for a pilot arc and a working arc, with switching elements provided within the housing 12. A gas conduit is also present within the torch assembly to transfer the gas that becomes the plasma arc to the torch tip. Various user input devices 20 such as buttons, switches and/or dials may be provided on the housing 12, along with various electrical and gas connectors.

It should be understood that the housing 12 illustrated in FIG. 1 is but a single example of a plasma arc torch device that could employ aspects of the inventive concepts disclosed herein. Accordingly, the general disclosure and description above should not be considered limiting in any way as to the types or sizes of plasma arc torch devices that could employ the disclosed torch elements.

As shown in FIG. 1, the torch assembly 14 includes a connector 22 at one end for attaching to a mating connector 23 of the housing 12. When connected in such way, the various electrical and gas passageways through the hose portion 24 of the torch assembly 14 are connected so as to place the relevant portions of the torch 200 in connection with the relevant portions within the housing 12. The torch 200 shown in FIG. 1 has a connector 201 and is of the handheld type, but as explained above the torch 200 can be of the mechanized type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes. For example, some of the components include a torch electrode, a nozzle, a shield, and a swirl ring.

Figure 2:
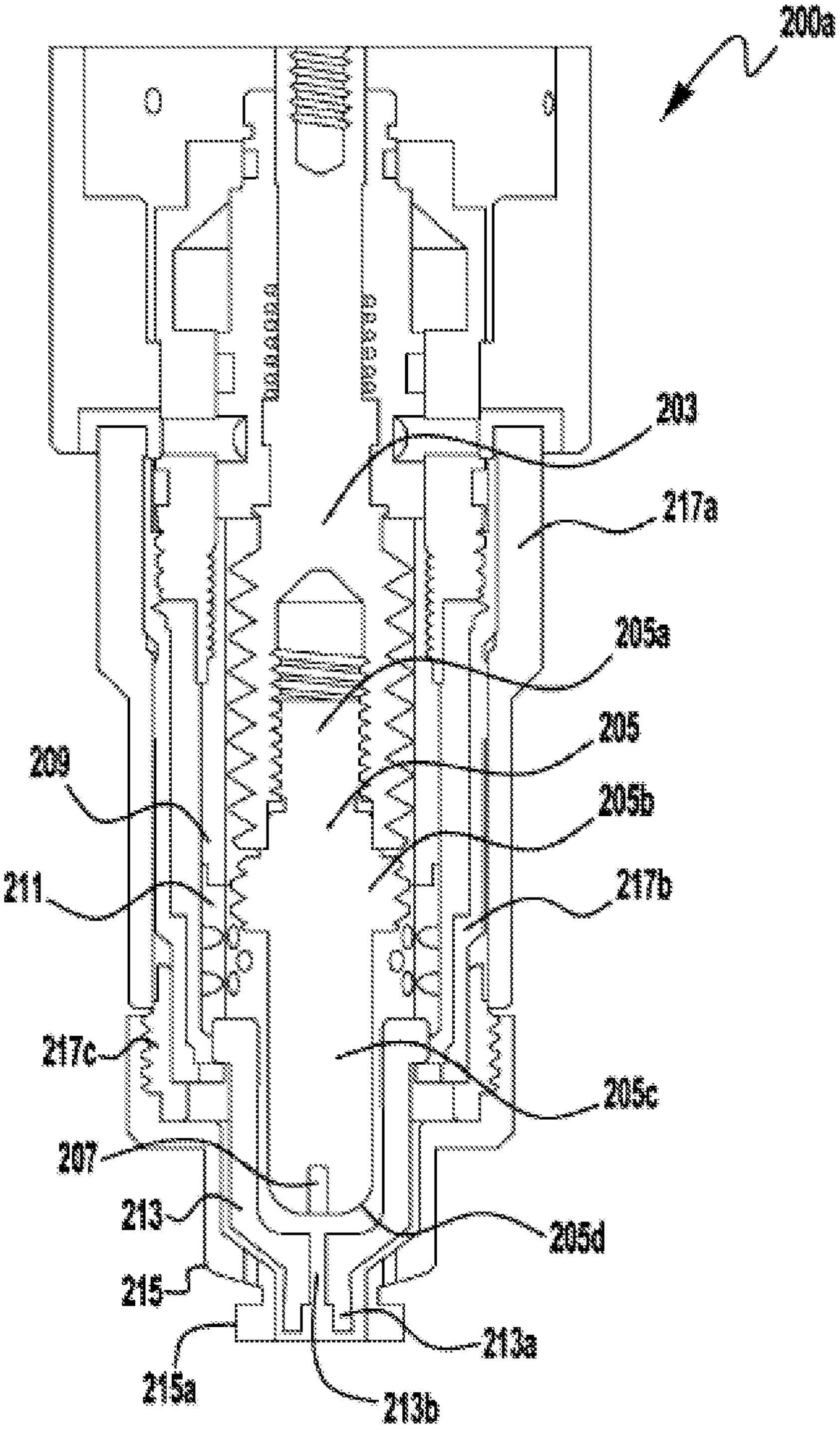
FIG. 2 PRIOR ART
FIG. 2 illustrates a portion of a plasma cutting torch using known components.

FIG. 2 depicts the cross-section of an exemplary torch head 200*a* of a known construction. It should be noted that some of the components of the torch head 200*a* are not shown for clarity. As shown, the torch 200*a* contains a cathode body 203 to which an electrode 205 is electrically coupled. The electrode 205 is inserted into an inside cavity of a nozzle 213, where the nozzle 213 is seated into a swirl ring 211 which is coupled to an isolator structure 209 which isolates the swirl ring, nozzle etc. from the cathode body 203. The nozzle 213 is held in place by the retaining cap assembly 217*a-c*. As explained previously, this construction is generally known.

As shown, the electrode 205 has a thread portion 205*a* which threads the electrode 205 into the cathode body 203. The electrode 205 also has a center helical portion 205*b*. The helical portion 205*b* has a helical coarse thread-like pattern which provides for flow of the air around the section 205*b*. Downstream of the center portion 205*b* is a cylindrical portion 205*c*, which extends to the distal end 205*d* of the electrode 205. As shown, the cylindrical portion is inserted into the nozzle 213, such that the distal end 205*d* is close to the throat 213*b* of the nozzle 213.

The cylindrical portion can include a flat surface at the center portion 205*b* so that a specialized tool can grab the electrode 205 to remove it from the cathode. Typically, the transition from the cylindrical portion 205*c* to the distal end 205*d* includes a curved edge leading a flat end face on the distal end 205*d*. In a retract start torch, this flat end face is in contact with the inner surface of the nozzle 213 to permit a starting current to flow. When the electrode 205 is retracted, a pilot arc is initiated in the gap (as shown) created between the electrode 205 and the nozzle 213, at which time the plasma jet is directed through the throat 213*b* of the nozzle 213 to the workpiece. The main transferred arc is established between the electrode and workpiece, and the pilot arc is extinguished. Once the arc is ignited the electrode 205 is retracted and a gap is created between the electrode 205 and the nozzle 213 (as shown), at which time the plasma jet is directed through the throat 213*b* of the nozzle 213 to the workpiece. It is generally understood, that with this configuration, known electrodes 205 can begin to fail during arc initiation after about 300 arc starts. The electrode 205 may be chrome or nickel plated to aid in increasing the life of the electrode 205. Once this event begins to occur, the electrode 205 may need to be replaced. Also, as shown, a hafnium insert 207 is inserted into the distal end 205*d* of the electrode 205. It is generally known that the plasma jet/arc initiates (emits) from this hafnium insert 207, which is centered on the flat surface of the distal end 205*d*.

As briefly explained above, the torch 200*a* also includes a nozzle 213 which has a throat 213*b* through which the plasma jet is directed during cutting. Also, as shown, the nozzle 213 contains a cylindrical projection portion 213*a* through which the throat 213*b* extends. This projection portion 213*a* provides for a relatively long throat 213*b* and extends into a cylindrical opening in the shield 215, which also has a cylindrical projection portion 215*a*. As shown, an air flow gap is created between each of the projection portions 213*a*/215*a* to allow a shielding gas to be directed to encircle the plasma jet during cutting. In air cooled torches, each of these respective projection portions 213*a*/215*a* direct the plasma jet and shield gas to the cutting operation.

Figure 3:
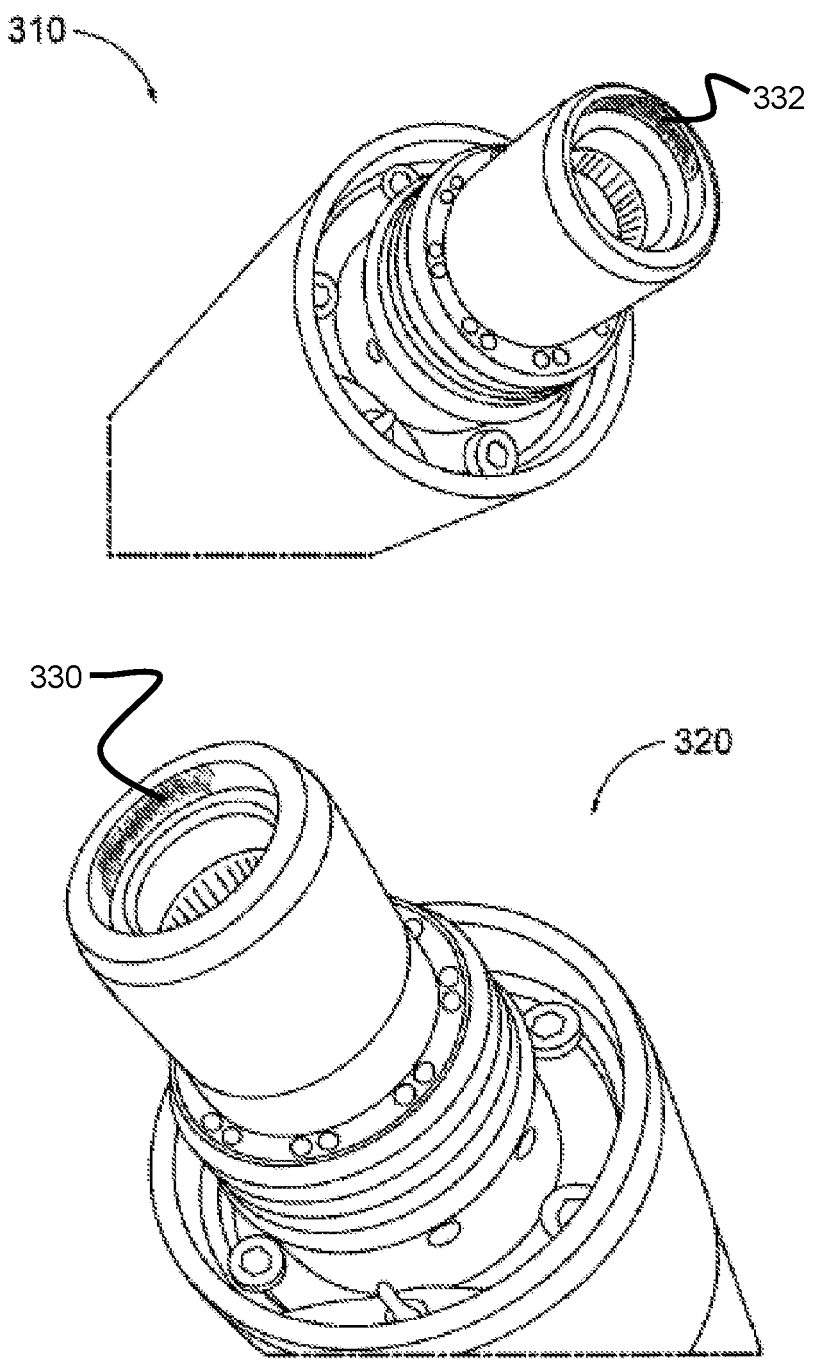
PRIOR ART FIG. 3
FIG. 3 illustrates examples of portions of plasma cutting torches that have experienced localized melting of an isolator of the plasma cutting torches due to an excessive cathode heat load.

FIG. 3 illustrates examples of portions 330 and 332 of plasma cutting torches 310 and 320 that have experienced localized melting of an isolator (insulator body) of the plasma cutting torches due to an excessive cathode heat load. Previous attempts at removing heat from a plasma cutting torch used consumables of larger form factor or detection of consumable failure through process monitoring via a power supply. However, such solutions are costly and time consuming. A quicker and more cost effective way to address heat problems is desired.

Figure 4:
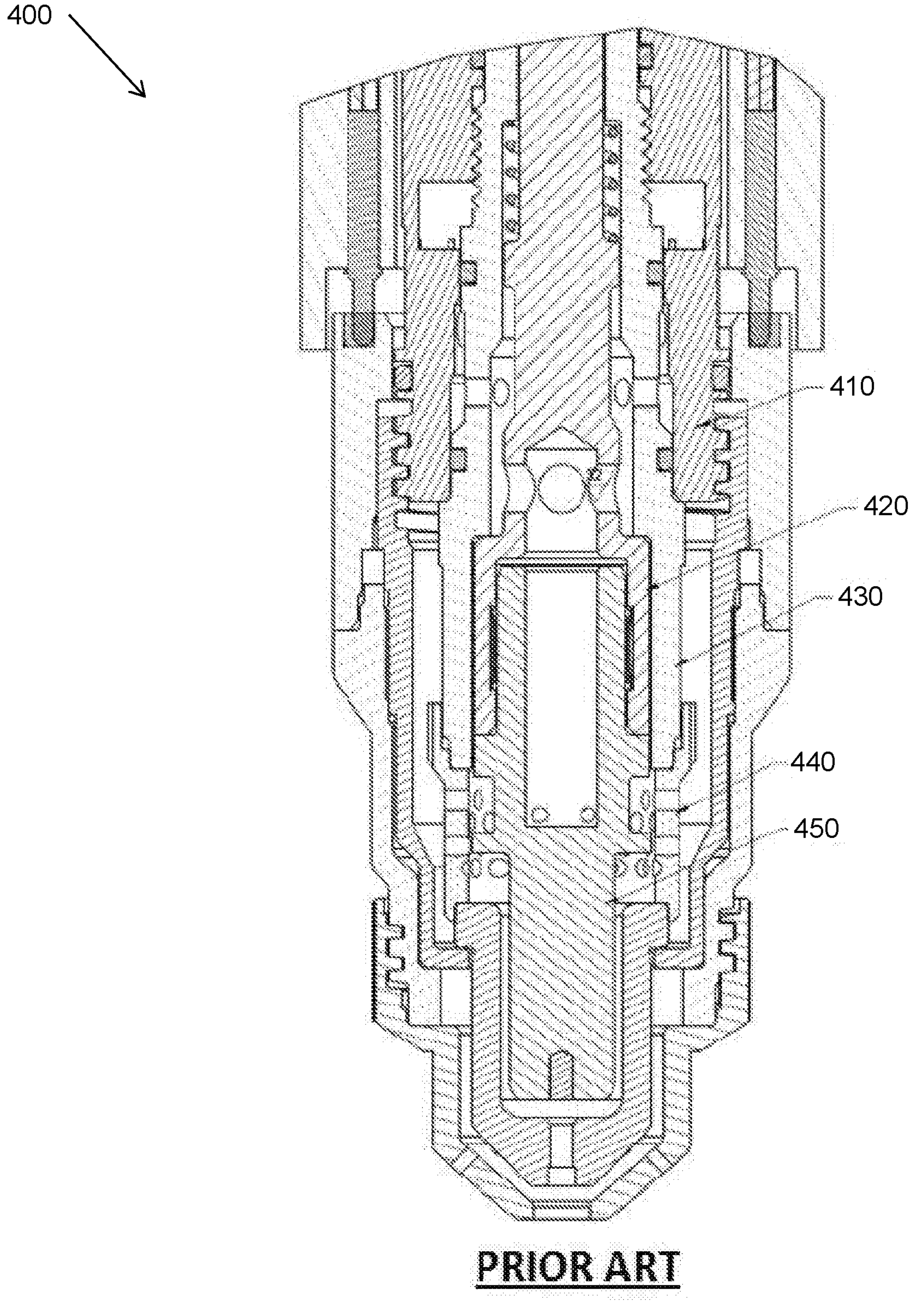
FIG. 4 illustrates a portion of a plasma cutting torch head using known components.

FIG. 4 illustrates a cross-sectional view of a portion of a plasma cutting torch head 400 using known components. Some of the known components shown include an anode body 410, a cathode body 420, an insulator body 430, a swirl ring 440, and an electrode 450. The cathode body 420 in an air-cooled retract start torch can become very hot during use, particularly at higher currents and/or with long duration cuts. In such a configuration, the cathode body 420 needs to be able to move for the torch 400 to work properly. Unless very expensive plastics, such as Vespel®, are used for the insulator body 430 between the anode body 410 and the cathode body 420, deformation of the plastic insulator body 430 can occur causing the cathode body 420 to be locked in place, likely ruining the torch head 400.

Figure 5:
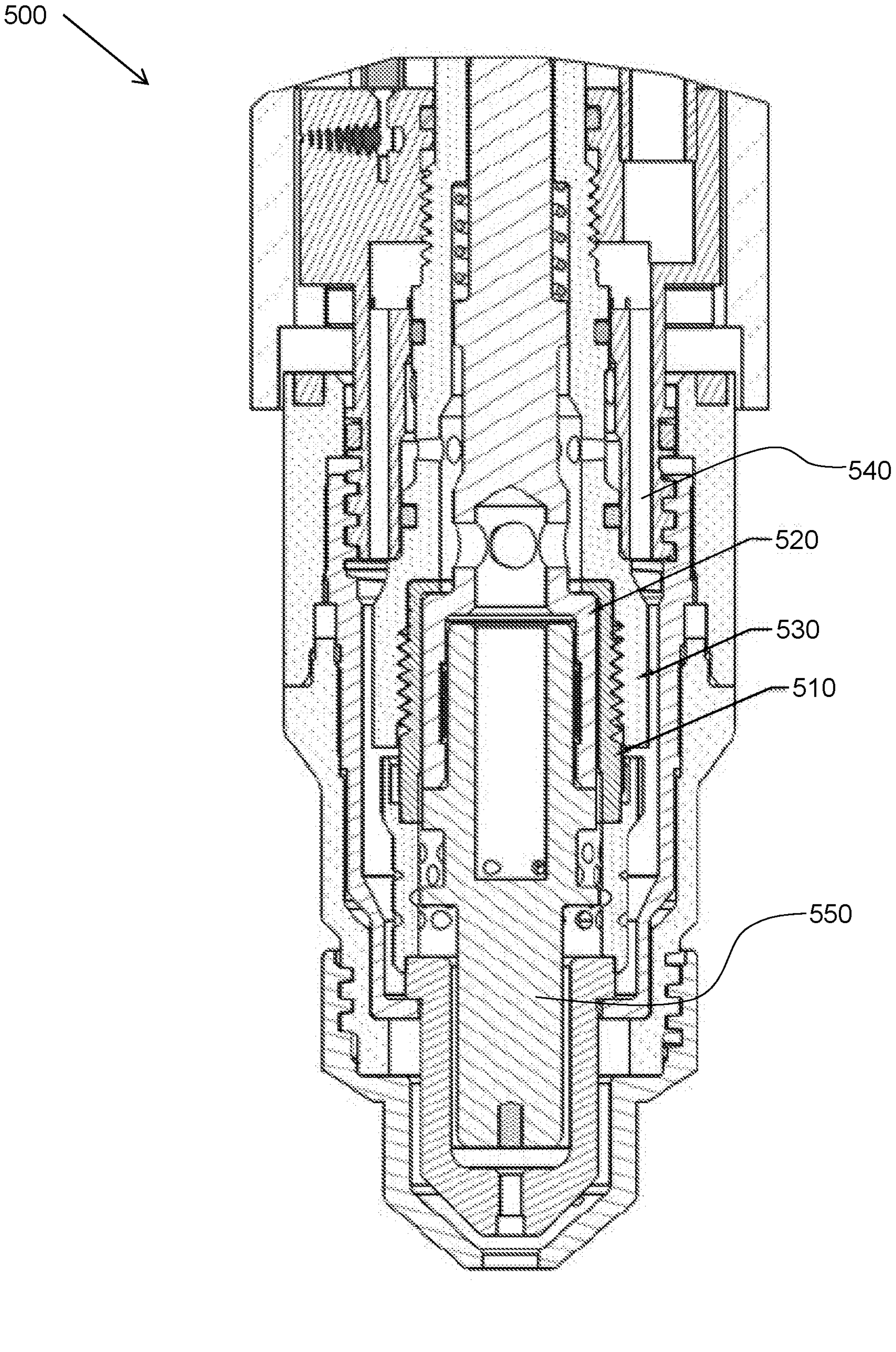
FIG. 5 illustrates a cross-sectional view of a torch head of an improved plasma cutting torch having a thermally isolating insert component.

FIG. 5 illustrates a cross-sectional view of a torch head 500 of an improved plasma cutting torch, in accordance with one embodiment, that is somewhat similar to the configuration of the plasma cutting torch 400 of FIG. 4, but also includes an insert component 510 along with a modified insulator body 530 to accommodate the insert component 510 within the torch head 500. As shown in FIG. 5, the insert component 510 is substantially between the cathode body 520 and the modified insulator body 530 (modified from that of the insulator body 430 of FIG. 4). The insert component 510 is able to withstand high temperatures and can be made of a metal material or a non-metal material (e.g., polymers, composites, other engineered material) such as, for example, Vespel®, which is a durable and high-performance polyimide-based plastic material. The insert component 510 can be permanent within the torch head 500 or can be replaceable, in accordance with various embodiments.

FIG. 5 shows the positional relationship between the insert component 510, the cathode body 520, the insulator body 530, the anode body 540, and the electrode 550. The insulator body 530 is positioned substantially between the insert component 510 and the anode body 540. The insert component 510 is positioned substantially between the cathode body 520 and the insulator body 530 and is configured to thermally protect the insulator body 530 from heat generated in the cathode body 520 during a plasma cutting operation using the plasma cutting torch.

Again, the insert component 510 may be a permanent component or a replaceable component within the torch head 500. The insulator body 530 is configured to electrically insulate the cathode body 520 from the anode body 540. Again, the insert component 510 may be made of a metal material. As an example, using a metal insert component 510, which is partially within and replaces the end of the plastic insulator body 430 of FIG. 4, results in the configuration of FIG. 5 which permits the use of much less expensive plastics within the torch head 500 (e.g. Ultem® instead of Vespel®). In accordance with some embodiments, the high temperature metal insert component 510 may be made from various metals or metallic alloys including, but not limited to, steel, stainless steel, aluminum, aluminum alloys, copper, and copper alloys.

Alternatively, the insert component 510 may be made of a non-metal material (e.g., polymers, composites, other engineered materials) such as, for example, Vespel®, which is a durable and high-performance polyimide-based plastic material. That is, the insert component 510 may be made of at least one of a polymer material, a composite material, or specifically a polyimide-based plastic material, in accordance with various embodiments. The insert component 510 may be made of an engineered high temperature material, in accordance with one embodiment. The insert component 510 is positioned at least partially within the insulator body, in one embodiment.

Figure 6:
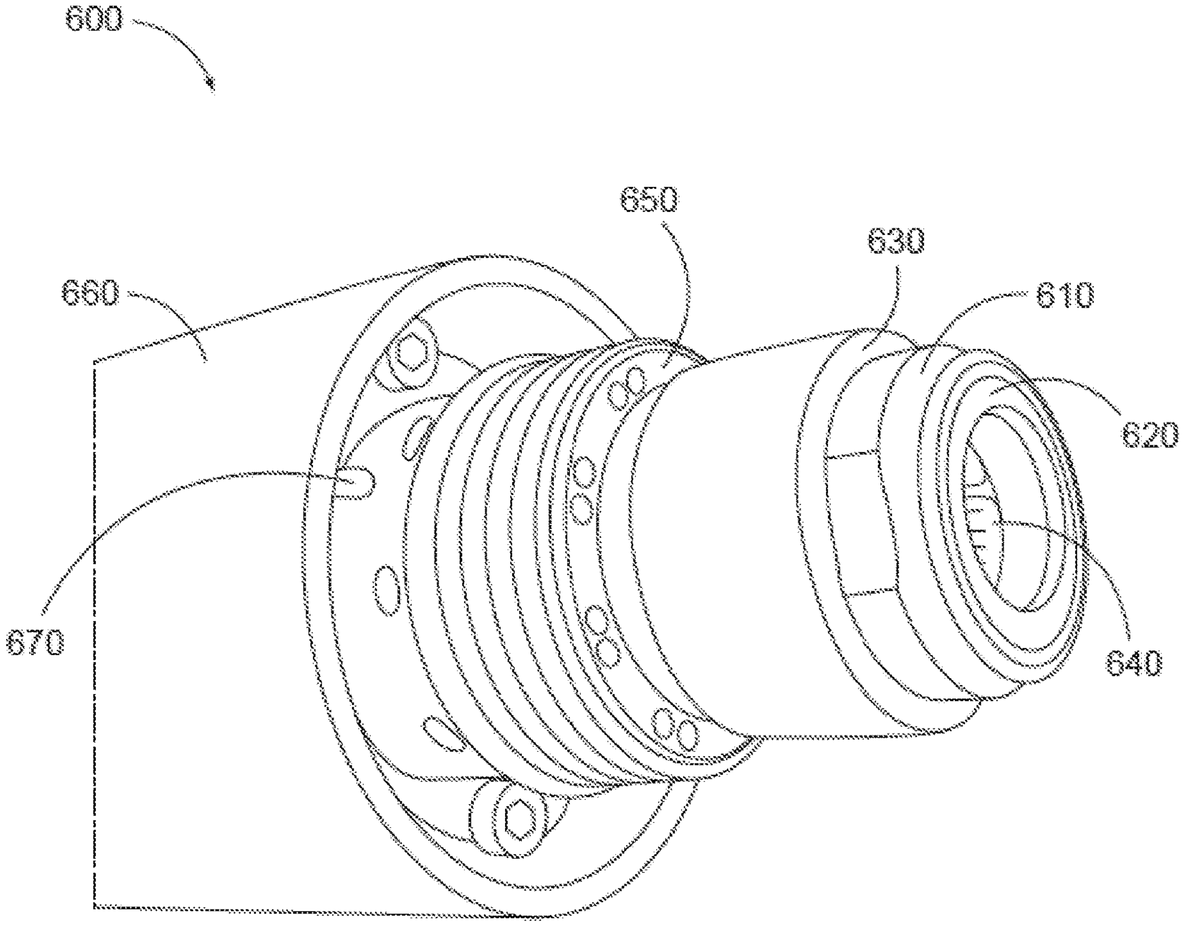
FIG. 6 illustrates an example embodiment of a portion of a torch head of an improved plasma cutting torch, similar to the configuration of FIG. 5, and having a thermally isolating insert component.

FIG. 6 illustrates an example embodiment of a portion of a torch head 600 of an improved plasma cutting torch, similar to the configuration of FIG. 5, having an insert component 610. Referring to FIG. 6, the torch head 600 of the plasma cutting torch includes a cathode body 620 configured to circumferentially surround at least a portion of a substantially cylindrical electrode (electrode not shown in FIG. 6, but shown in FIG. 5 as electrode 550). Furthermore, the insert component 610 circumferentially surrounds at least a portion of the cathode body 620, an insulator body 630 circumferentially surrounds at least a portion of the insert component 610, and an anode body 650 circumferentially surrounds at least a portion of the insulator body 630.

The torch head 600 includes an electrical spring contact 640 configured to hold the electrode in place and enable a good electrical connection between the cathode body 620 and the electrode. The torch head 600 also includes a contact probe/pin 670 configured to sense whether or not there is a retaining cap in place in the torch head to ensure that all of the torch consumables are in place. The torch head 600 also includes a torch body 660 circumferentially surrounding the internal components of the torch head 600.

The insert component 610 is made of a material that is configured to at least partially thermally isolate the insulator body 630 from the cathode body 620 during a plasma cutting operation using the plasma cutting torch. Again, the insert component 610 may be a permanent component or a replaceable component within the torch head 600, in accordance with various embodiments. The insulator body 630 is configured to electrically insulate the cathode body 620 from the anode body 650.

Again, the insert component 610 may be made of at least one of steel, stainless steel, aluminum, aluminum alloys, copper, or copper alloys, in accordance with various embodiments. Alternatively, the insert component 610 may be made of at least one of a polymer material or a composite material, in accordance with other embodiments. For example, the insert component 610 may be made of a polyimide-based plastic material. In one embodiment, the insert component 610 is made of an engineered material. In accordance with one embodiment, a first portion of the insert component 610 is made of a metal material and a second portion of the insert component 610 is made of a non-metal material.

The insert component 610 may be at least partially within the insulator body 630, in accordance with one embodiment. For example, as shown in FIG. 6, a portion of the insert component 610 extends beyond an internal region of the insulator body 630 toward a plasma-emitting end of the torch head 600. Also, as shown in FIG. 5, a portion of the insert component 510 extends beyond an internal region of the insulator body 530 toward a plasma-emitting end of the torch head 600.

In this manner, a thermally isolating insert component is used to protect at least the insulator body within a torch head from heat produced at the cathode body, thus allowing the insulator body to continue to electrically insulate the cathode body from the anode body over a longer operational life of the torch head.

While the disclosed embodiments have been illustrated and described in considerable detail, it is not the intention to restrict or in any way limit the scope of the claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. For example, alternative methods and/or systems with additional or alternative components may be utilized to configure a plasma cutting torch to allow for heat isolation of torch components. It is sought, therefore, to cover all such changes and modifications as fall within the spirit and scope of the general inventive concepts, as defined by the claims, and equivalents thereof.

What is claimed is:

1. A torch head of a plasma cutting torch, comprising:

an electrode;

a cathode body electrically coupled to the electrode;

an insert component;

an insulator body; and an anode body, wherein the insulator body is positioned substantially between the insert component and the anode body, and wherein the insert component is positioned substantially between the cathode body and the insulator body and is configured to thermally protect the insulator body from heat generated in the cathode body during a plasma cutting operation using the plasma cutting torch.

2. The torch head of claim 1, wherein the insert component is a permanent component within the torch head.

3. The torch head of claim 1, wherein the insert component is a replaceable component within the torch head.

4. The torch head of claim 1, wherein the insulator body is configured to electrically insulate the cathode body from the anode body.

5. The torch head of claim 1, wherein the insert component is made of a metal material.

6. The torch head of claim 1, wherein the insert component is made of at least one of steel, stainless steel, aluminum, aluminum alloys, copper, or copper alloys.

7. The torch head of claim 1, wherein the insert component is made of a non-metal material.

8. The torch head of claim 1, wherein the insert component is made of at least one of a polymer material or a composite material.

9. The torch head of claim 1, wherein the insert component is made of polyimide-based plastic material.

10. The torch head of claim 1, wherein the insert component is made of an engineered material.

11. The torch head of claim 1, wherein the insert component is at least partially within the insulator body.

12. A torch head of a plasma cutting torch, comprising:

a substantially cylindrical electrode;

a cathode body circumferentially surrounding at least a portion of the electrode;

an insert component circumferentially surrounding at least a portion of the cathode body;

an insulator body circumferentially surrounding at least a portion of the insert component; and an anode body circumferentially surrounding at least a portion of the insulator body, wherein the insert component is made of a material that is configured to at least partially thermally isolate the insulator body from the cathode body during a plasma cutting operation using the plasma cutting torch.

13. The torch head of claim 12, wherein the insert component is a permanent component within the torch head.

14. The torch head of claim 12, wherein the insert component is a replaceable component within the torch head.

15. The torch head of claim 12, wherein the insulator body is configured to electrically insulate the cathode body from the anode body.

16. The torch head of claim 12, wherein the insert component is made of at least one of steel, stainless steel, aluminum, aluminum alloys, copper, or copper alloys.

17. The torch head of claim 12, wherein the insert component is made of at least one of a polymer material or a composite material.

18. The torch head of claim 12, wherein the insert component is made of polyimide-based plastic material.

19. The torch head of claim 1, wherein the insert component is made of an engineered material.

20. The torch head of claim 1, wherein the insert component is at least partially within the insulator body.

* * * * *